(12) United States Patent  
Momose et al.

(10) Patent No.: US 7,942,055 B2
(45) Date of Patent: May 17, 2011

(54) ACCELERATION SENSOR

(75) Inventors: Kazuhisa Momose, Kokubu (JP); Masafumi Hisataka, Kokubu (JP)

(73) Assignee: Kyocera Corporation, Kyoto (JP)

( * ) Notice: Subject to any disclaimer, the term of this patent is extended or adjusted under 35 U.S.C. 154(b) by 679 days.

(21) Appl. No.: 12/088,920

(22) PCT Filed: Oct. 4, 2005

(86) PCT No.: PCT/JP2005/018377
§ 371 (c)(1),
(2), (4) Date: Apr. 1, 2008

(87) PCT Pub. No.: WO2007/043140
PCT Pub. Date: Apr. 19, 2007

(65) Prior Publication Data
US 2009/0151453 A1 Jun. 18, 2009

(51) Int. Cl.
*G01P 15/09* (2006.01)
(52) U.S. Cl. ............... 73/514.34; 310/329; 310/348
(58) Field of Classification Search ........... 73/514.34; 310/329, 330, 331, 348
See application file for complete search history.

(56) References Cited

U.S. PATENT DOCUMENTS

| 3,113,223 | A | * | 12/1963 | Smith et al. | 310/329 |
| 5,539,270 | A | * | 7/1996 | Kaji et al. | 310/329 |
| 7,394,610 | B2 | * | 7/2008 | Kuwahata | 360/75 |

FOREIGN PATENT DOCUMENTS

| JP | 07-036064 | 7/1995 |
| JP | 09-033261 | 2/1997 |
| JP | 09-113533 | 5/1997 |
| JP | 09113533 A | 5/1997 |
| JP | 09203745 A | 8/1997 |
| JP | 2005-315847 | 11/2005 |

OTHER PUBLICATIONS

Chinese language office action and its English language translation for corresponding Chinese application 2005800517464 lists the reference above, dated Aug. 7, 2009.

Chinese language office action dated Jul. 12, 2010 and its English language translation for corresponding Chinese application 2005800517464 lists the reference above.

* cited by examiner

*Primary Examiner* — John E Chapman

(74) *Attorney, Agent, or Firm* — DLA Piper LLP (US)

(57) ABSTRACT

Disclosed is an acceleration sensor having a small variation in detection sensitivity, in which one end portion of an oscillation detecting element is fixed so that the free length thereof does not vary. Supporting resins 4a, 4b are formed in one end portion of the oscillation detecting element 3. With the oscillation detecting element being inserted into a through hole 2h of a holding member 2 provided in a case 1, the supporting resins 4a, 4b are in close contact with the inner periphery of the through hole 2h. As a result, the oscillation detecting element 3 is fixed to and held by the holding member 2.

7 Claims, 4 Drawing Sheets

ACCELERATION SENSOR

TECHNICAL FIELD

The present invention relates to an acceleration sensor using an oscillation detecting element comprising a piezoelectric substrate.

BACKGROUND ART

Acceleration sensors have been used for hard disc drives to detect stress caused by external impact and vibration applied to the hard disc drives.

Various structures have been proposed for an acceleration sensor according to the use thereof. One known example of acceleration sensor with relatively high detection sensitivity is an acceleration sensor with a cantilever structure including an oscillation detecting element whose one end portion is held while the other end portion is free (e.g. Patent Document 1).

The foregoing conventional acceleration sensor is arranged such that a side surface of a holding member in the form of a rectangular parallelepiped is provided with a lateral hole and the upper surface thereof is provided with a vertical hole that is communicated with the lateral hole, and an oscillation detecting element is inserted into the lateral hole and tentatively fixed, then after supporting resin is injected through the vertical hole to cure the resin so as to hold one end portion of the oscillation detecting element.

The holding member that holds the oscillation detecting element is mounted on a metal case, and the oscillation detecting element, holding member and metal case are accommodated in a case made of resin.

When acceleration generated by impact or the like is applied to such an acceleration sensor, the oscillation detecting element bends to cause deformation of a piezoelectric substrate constituting the oscillation detecting element.

An electric charge is generated by the piezoelectric effect in the deformed piezoelectric substrate, which further causes a potential difference between the signal electrodes formed on both principal surfaces of the piezoelectric substrate. Acceleration is detected from detecting a voltage obtained by this potential difference. Patent Document 1: Japanese Unexamined Patent Publication No. 9-113533

DISCLOSURE OF THE INVENTION

Problems to be Solved by the Invention

Since the detection sensitivity of an acceleration sensor is related to the free length, i.e., the length from a bend starting point to a free end point of the detection element, a displacement of the bend starting point causes variations in the detection sensitivity. Therefore, the bend starting point is preferably kept unchanged.

However, in the case of the acceleration sensor mentioned above, since the displacement of the oscillation detecting element is regulated not only by the end portion accommodated in the vertical hole but also by the inner periphery of the lateral hole provided for tentative fixing, a bend starting point is generated also in the part accommodated in the lateral hole. That is, since the bend starting point can variable between the one end portion of the oscillation detecting element accommodated in the vertical hole and the part of the same accommodated in the lateral hole, the acceleration sensor has a problem of a large variation in the detection sensitivity.

The present invention has been made with the foregoing background in mind and therefore it is an object of the present invention to provide an acceleration sensor having a small variation in the detection sensitivity.

Solution to the Problems

An acceleration sensor according to the present invention comprises an oscillation detecting element including a rectangular strip-shaped piezoelectric substrate and signal electrodes attached to both surfaces of the piezoelectric substrate and a holding member for holding the oscillation detecting element. The holding member is provided with a through hole into which the oscillation detecting element is inserted and one end portion of the oscillation detecting element is provided with a supporting resin. With the oscillation detecting element being inserted in the through hole, the supporting resin is in close contact with an inner periphery of the through hole. The oscillation detecting element is held by the holding member in this manner.

In the acceleration sensor according to the present invention, since the location of a starting point where the bend of the oscillation detecting element occurs is limited to the part of the oscillation detecting element being inserted in the through hole, the free length of the oscillation detecting element is less variable, so that variation of the detection sensitivity of the acceleration sensor can be restricted effectively.

In addition, an acceleration sensor according to the present invention is accommodated in a case in the form of a rectangular parallelepiped having an opening, and the holding member is disposed in the vicinity of the opening of the case. This structure allows easy accommodation of the oscillation detecting element in the case even after assembly of the case.

Moreover, an acceleration sensor according to the present invention is a sensor wherein the holding member is disposed being apart from the opening of the case toward the interior of the case by a predetermined distance, and a sealing resin is filled in a region enclosed by an outer surface of the holding member and an inner periphery of the case on the side of the opening. This structure provides protection of the oscillation detecting element and the holding member and firm attachment of the holding member to the case.

When the sealing resin and the supporting resin are both include an epoxy resin and both the resins are bonded to each other in the vicinity of the opening of the case, strong adhesion can be established between the sealing resin and the supporting resin, which results in more stable holding of the oscillation detecting element.

Furthermore, an acceleration sensor according to the present invention may be arranged such that terminal electrodes provided on an outer surface of the case are drawn to extend to the outer surface of the holding member and the signal electrodes attached to the piezoelectric substrate are exposed on the side of the opening of the case so that the drawn end portions of the terminal electrodes are electrically connected to the exposed portions of the signal electrodes through a conductive bonding material. By this arrangement, connection between the signal electrodes and the external terminals can be established easily and reliably.

When a depressed section is provided on the outer surface of the holding member and the depressed section is filled with a conductive bonding material, the conductive bonding material spreading out can be prevented, and unwanted short circuit of the conductive bonding material can be prevented.

When the conductive bonding material comprises a first conductive bonding material and a second conductive material and a weir is formed between the first and second conductive bonding materials, short circuit between the first and second conductive bonding materials can be effectively prevented.

These and other advantages, features and effects of the present invention will be apparent from the following description of preferred embodiments with reference to the accompanying drawings.

Figure 1:
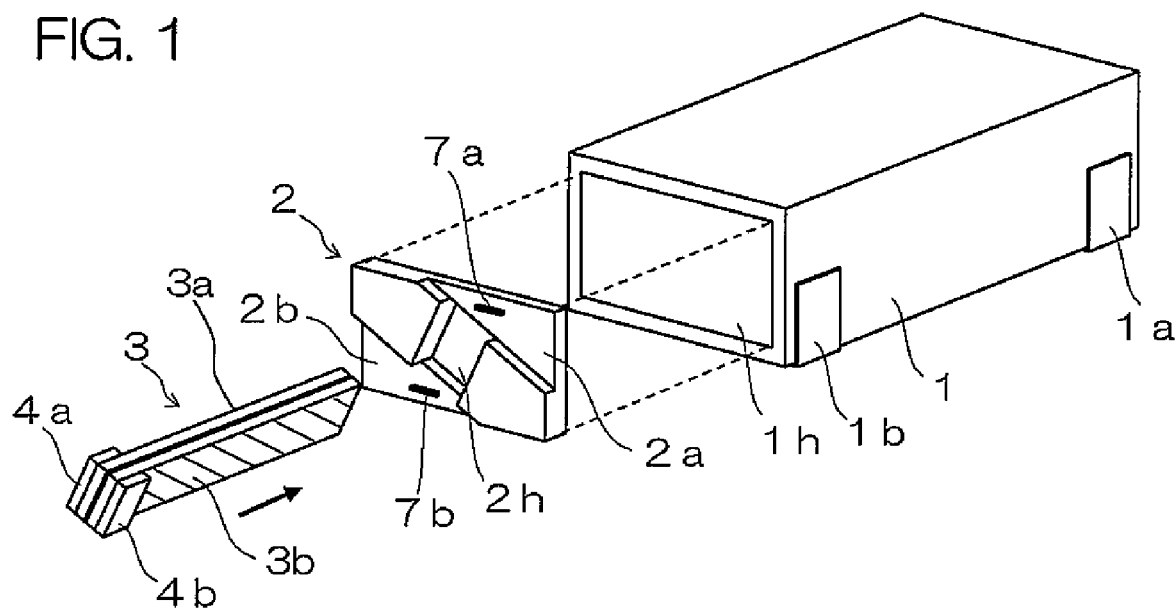
FIG. 1 is an exploded perspective view of an acceleration sensor according to one embodiment of the present invention.

DESCRIPTION OF THE REFERENCE SYMBOLS 1 case
1a, 1b terminal electrode
1h opening
2 holding member
2a, 2b depressed section
2h through hole
3 oscillation detecting element
4a, 4b supporting resin
5 sealing resin
6a, 6b conductive bonding material
7a, 7b end portion of terminal electrode
8a, 8b resin weir
9 adhesive agent
31, 32 piezoelectric substrate
31a, 31b, 32a, 32b signal electrode

PREFERRED EMBODIMENT OF THE INVENTION

Figure 2:
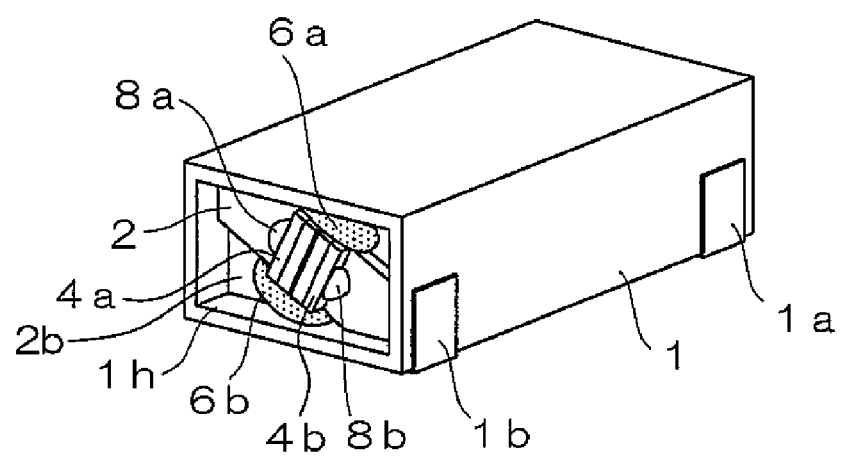
FIG. 2 is an external perspective view showing the acceleration sensor after assembly.
Figure 3:
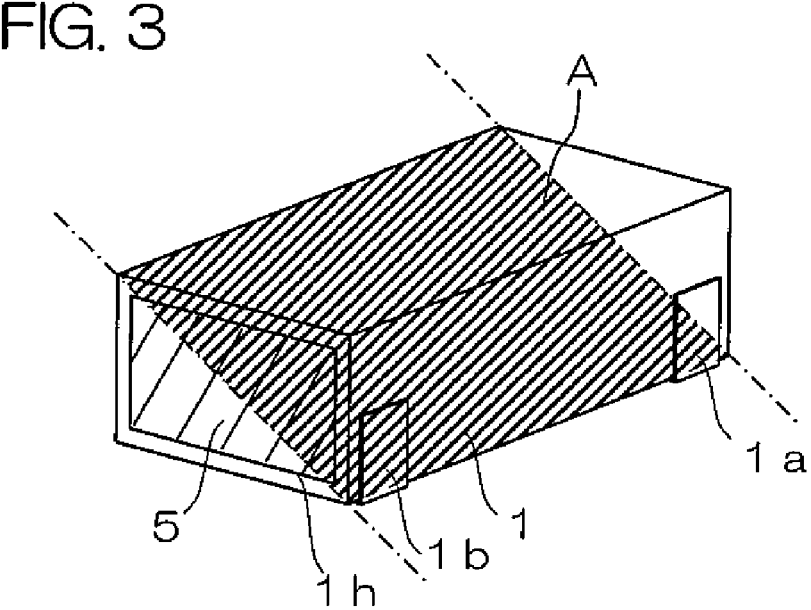
FIG. 3 is an external perspective view showing the acceleration sensor of FIG. 2 in a state where a sealing resin is applied thereto.

FIG. 1 is an exploded perspective view of an acceleration sensor according to one embodiment of the present invention and FIG. 2 is an external perspective view showing the acceleration sensor after assembly. FIG. 3 is an external perspective view showing the acceleration sensor of FIG. 2 in a state where a sealing resin is applied thereto.

The acceleration sensor is constituted, generally, of a case 1 for accommodating an oscillation detecting element 3, an oscillation detecting element 3 accommodated in the case 1, and a holding member 2 for holding the oscillation detecting element 3 within the case 1.

The case 1 is a container member in the form of a rectangular parallelepiped having an opening 1h on one end side thereof, and made of, for example, liquid crystal polymer (LCP), polyphenylene sulfide (PPS), polyetheretherketone (PEEK) or the like.

The case 1 has terminal electrodes 1a, 1b attached thereto. By connection of these terminal electrodes 1a, 1b to pads on an external printed wiring board by means of solder or the like, the acceleration sensor is fixed on the printed wiring board and electrically connected to the printed wiring board.

The terminal electrodes 1a, 1b are formed of phosphor bronze, for example, and set to have a thickness of 0.1 to 0.5 mm. In the acceleration sensor of this embodiment, the terminal electrodes 1a, 1b are formed integrally with the case 1 by insertion molding.

The holding member 2 for holding the oscillation detecting element 3 is attached to the case 1. The holding member 2 is disposed in the vicinity of the opening 1h of the case 1. In this embodiment, the case 1 and the holding member 2 are formed from separate parts and the holding member 2 is fixed to the case 1 by fitting the holding member 2 to the inner periphery of the case 1.

In addition, as shown in FIG. 1, a through hole 2h for pressing and holding the oscillation detecting element 3 therein is provided in a central part of the holding member 2.

The through hole 2h is formed to have a generally rectangular shape and to incline with respect to the horizontal direction. This is intended for holding the oscillation detecting element 3 in an inclined state so as to detect oscillations in both horizontal and vertical directions as later described.

Figure 4:
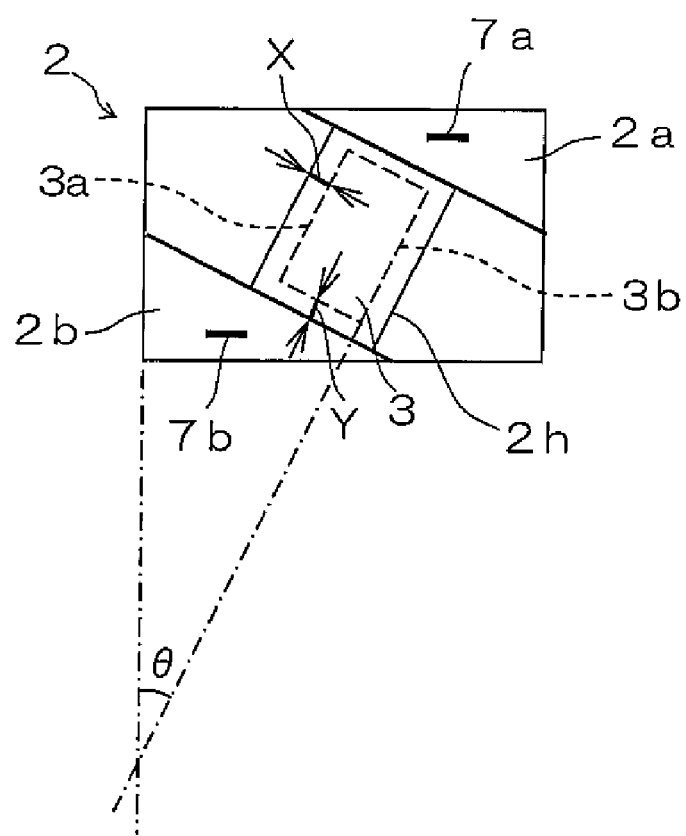
FIG. 4 is a front view of a holding member.

FIG. 4 is a front view of a holding member 2 formed with a through hole 2h. The outer profile (which refers to the outer dimensions of the oscillation detecting element 3 excluding supporting resins 4a, 4b) of the oscillation detecting element 3 is shown by dashed lines.

The dimensions of the through hole 2h is designed to be slightly larger than the outer dimensions of the oscillation detecting element 3. Specifically, the distance X between an outer profile of the oscillation detecting element 3 and an inner surface of the through hole 2h is designed, for example, to be 10 μm-20 μm, and the distance Y between a side surface of the oscillation detecting element 3 and an inner side surface of the through hole 2h is designed, for example, to be 10 μm-30 μm.

In addition, depressed sections 2a, 2b are provided in a couple of diagonal corners of the holding member 2. The depressed sections 2a, 2b serve as the potting regions of the conductive bonding materials 6a, 6b, as later described. End portions 7a, 7b of terminal electrodes extended from the terminal electrodes 1a, 1b are exposed within the depressed sections 2a, 2b.

Figure 5:
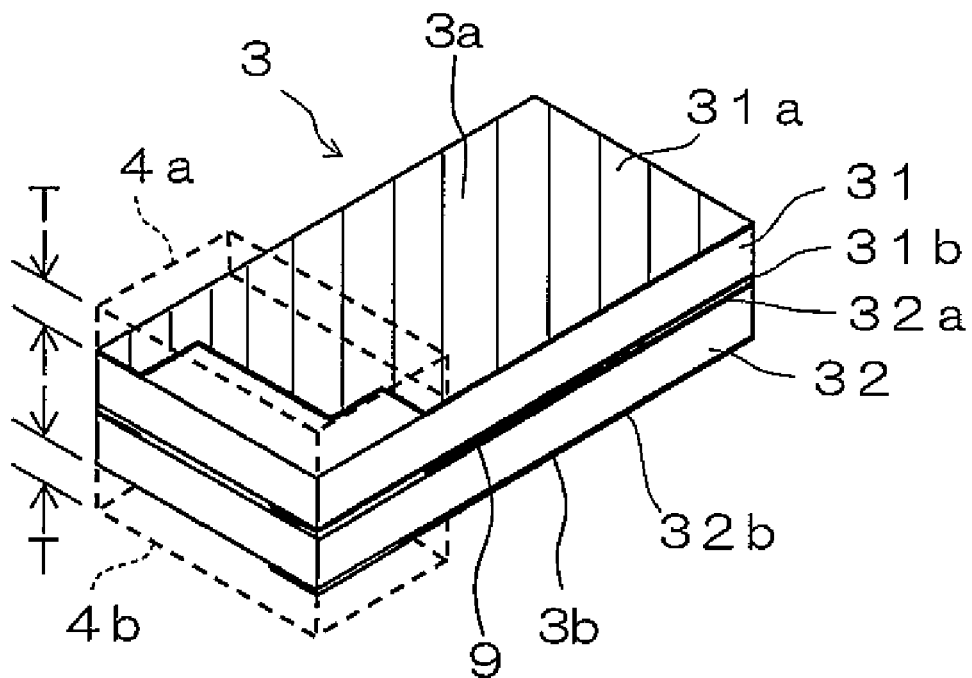
FIG. 5 is an external perspective view of an oscillation detecting element.

The oscillation detecting element 3 held by such a holding member 2 has a structure, as shown in FIG. 5, including a plurality of rectangular strip-like piezoelectric substrates 31, 32 each attached with a couple of signal electrodes 31a, 31b, 32a, 32b, that are bonded through an adhesive agent 9.

The acceleration sensor of this embodiment adopts an oscillation detecting element including two piezoelectric substrates 31, 32 bonded together to constitute a bimorph structure.

The piezoelectric substrates 31, 32 are polarized in the thickness direction and made of a piezoelectric ceramic material such as lead zirconium titanate, lead titanate or the like, and the dimensions thereof are designed to form rectangular strips of 0.5 to 5.0 mm in length, 0.2 to 1.0 mm in width and 0.1 to 1.0 mm in thickness.

To produce the piezoelectric substrates 31, 32, a process including the following steps is adopted: a sheet producing step in which a binder is mixed with material powder and the mixture is pressed to form a sheet, or the material powder is mixed with water and a dispersant using a ball mill and dried, then a binder, a solvent, a plasticizer and the like are added thereto so as to form a sheet-shape through a doctor-blade method; forming a substrate by firing at a peak temperature of 1100° C.-1400° C. for several ten minutes to several hours;

and polarizing the substrate by applying a voltage of 3 kV/mm to 15 kV/mm in the thickness direction at a temperature of 60° C.-150° C.

Supporting resins 4a, 4b are attached to both principal surfaces 3a, 3b of the oscillation detecting element 3. The supporting resins 4a, 4b include an epoxy resin or the like.

It is important here that thickness T before insertion of the part of the supporting resins 4a, 4b to be in contact with the through hole 2h should be greater than the distance X between the principal surfaces 3a, 3b of the oscillation detecting element 3 and internal surfaces of the through hole 2h. For example, the thickness T is determined to be greater than the distance X by 0.3 μm-60 μm.

The formation of the supporting resins 4a, 4b is carried out such that, a sheet including two piezoelectric mother substrates that are to serve as piezoelectric substrates 31, 32 bonded together is first prepared, and resin paste is printed on the predetermined areas on both surfaces of the sheet by screen printing and cured. The screen printing may be repeated a plurality of times or the upper surfaces of the supporting resins may be ground to achieve precise thickness according to the need.

Then, while the positions of the cured resin paste are observed, cutting is carried out by means of a dicing saw or the like so as to obtain supporting resins with a predetermined length and a predetermined free length. Accordingly, an oscillation detecting element 3 attached with the supporting resins 4a, 4b can be fabricated. The dimensions of the oscillation detecting element 3 are, for example, 3.0 mm in length, 0.5 mm in width, 0.25 mm in thickness and 2.0 mm in free length.

The foregoing oscillation detecting element 3 is inserted into the through hole 2h of the holding member 2 from its one end, and the other end portion thereof formed with the supporting resins 4a, 4b is pressedly inserted into the through hole 2h to be held by the holding member 2.

The oscillation detecting element 3 held by the holding member 2 has one end portion that is inserted earlier as a free end and the other end portion as a fixed end, which forms a so-called cantilever acceleration sensor.

Since a couple of supporting resins 4a, 4b are closely attached to the inner surfaces of the through hole 2h of the holding member 2 provided in the case 1 in the foregoing manner, the location where a bending starting point of the oscillation detecting element 3 is generated can be determined to be the part where the oscillation detecting element 3 is inserted in and in contact with the through hole 2h. This makes the free length of the oscillation detecting element less variable, so that it is possible to effectively restrict variations in the detection sensitivity of the acceleration sensor.

When external physical impact is applied to the fixed oscillation detecting element 3, the free end side bends upon the holding member 2 to produce an electric charge to the couples of signal electrodes 31a, 31b, 32a, 32b attached to the bonded piezoelectric substrates 31, 32. Therefore, that the impact can be detected as oscillation.

Figure 6:
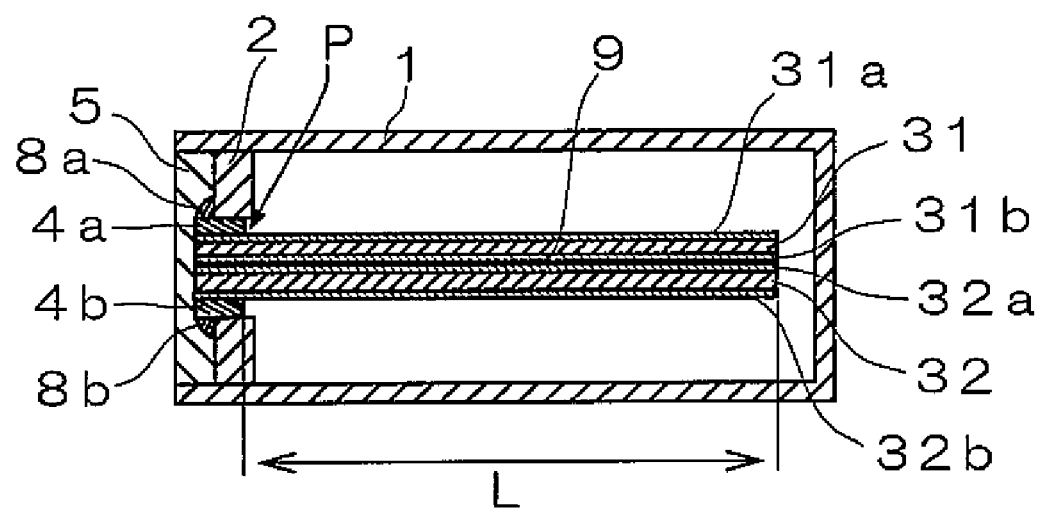
FIG. 6 is a view of the cross section A of the acceleration sensor of FIG. 3.

FIG. 6 shows a cross section taken along the diagonal plane A of FIG. 3. Free length L of the oscillation detecting element 3 is a length between the free end of the oscillation detecting element 3 to a point P that is closest to the free end side in the region where the supporting resins 4a, 4b is closely attached to the inner surface of the through hole 2h.

Figure 7:
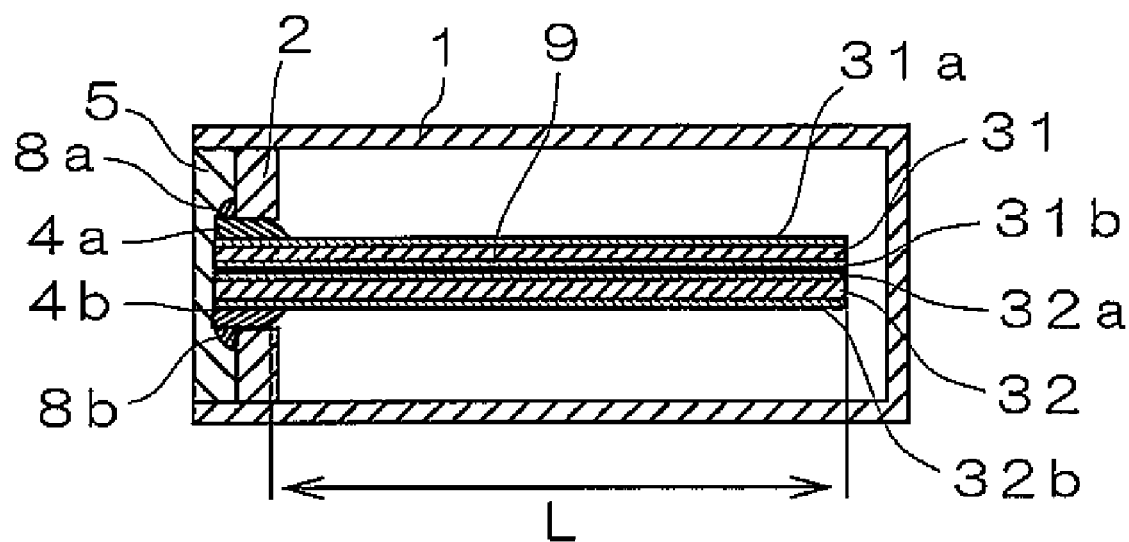
FIG. 7 is a cross sectional view of an acceleration sensor according to another embodiment of the present invention.

In addition, it is preferred that the supporting resins 4a, 4b are formed so as to taper in thickness toward the free end, as shown in FIG. 7. Forming the supporting resins 4a, 4b to have tapered shapes and inserting the oscillation detecting element 3 into the opening from its free end can facilitate the insertion smoothly and can prevent breakage of the supporting resins 4a, 4b.

As mentioned above, the oscillation detecting element 3 is held to incline with respect to the horizontal direction so that it can detect not only vertically applied stress but also laterally applied stress. Specifically, an angle θ (the angle on the acute side shown in FIG. 4) formed by a plane perpendicular to the mounting surface of the case 1 and the principal surface 3a, 3b of the oscillation detecting element 3 is determined to be in the range of 20° to 50° according to the use.

The material for the signal electrodes 31a, 31b, 32a, 32b attached to the piezoelectric substrates 31, 32 may be a metal having good conductivity such as gold, silver, copper, chromium, nickel, tin, lead, aluminum or the like. The metal material is deposited/formed by a conventionally known technique such as vapor deposition, sputtering or the like on the piezoelectric substrates 31, 32, or prescribed conductive paste including the foregoing metal material is applied in a predetermined pattern by a conventionally known printing method and then baked at a high temperature for deposition/formation.

An oscillation detecting element 2 is configured by bonding the two piezoelectric substrates 31, 32 attached with the signal electrodes by means of an adhesive agent 9.

For the adhesive agent 9, insulative materials including glass fabric based epoxy resin, inorganic glass, epoxy resin and the like, or conductive materials including conductive adhesive agents, metal sheet and the like may be used. In the case of bonding by glass fabric based epoxy resin, the piezoelectric substrates are vertically laminated with a prepreg including epoxy resin-impregnated glass fabric interposed therebetween and heated while being pressed so that the epoxy resin is compressed to a predetermined thickness and cured. In the case of bonding by inorganic glass material, the substrates are laminated after being applied with glass paste by printing, and while a load is applied to the laminate to melt and unit using a baking furnace. The baking in the baking furnace is carried out at a temperature of 300 to 700° C. When the baking is carried out in a vacuum furnace, bubbles can be prevented from mixing into the intermediate bonding glass layer. Where high temperature bonding at a temperature of 300° C. or higher is carried out, the piezoelectric substrates are depolarized. Therefore, a polarization process needs to be carried out after the bonding process.

The signal electrodes 31a, 31b, 32a, 32b are arranged to be partially exposed on the side of the opening 1h of the case 1.

The terminal electrodes 1a, 1b provided on the outer surface of the case 1 are extended through the interiors of the case 1 and holding member 2 to the outer surface of the holding member 2. An end portion 7a of the terminal electrode 1a that is extended to the outer surface of the holding member 2 is electrically connected to exposed portions of the signal electrodes 31a, 31b on the side of the opening of the case 1 by a first conductive bonding material 6a as shown in FIG. 2. Likewise, an end portion 7b of the terminal electrode 1b that is extended to the outer surface of the holding member 2 is electrically connected to exposed portions of the signal electrodes 32a, 32b on the side of the opening of the case 1 by a first conductive bonding material 6a as shown in FIG. 2.

With this arrangement, connection between the signal electrodes 31a, 31b, 32a, 32b and the external terminals 1a, 1b can be made easily and reliably even after the oscillation detecting element 2 is accommodated in the case 1.

The first and second conductive bonding materials 6a, 6b are filled and cured within the depressed sections 2a, 2b, respectively, provided in the holding member 2. By providing such depressed sections 2a, 2b in the holding member 2, the first and second conductive bonding materials 6a, 6b can be prevented from spreading in filling of the first and second conductive bonding materials 6a, 6b, to prevent unwanted short circuit between the first and second conductive bonding materials 6a, 6b.

Further, weir portions 8a, 8b made of resin are provided between the first conductive bonding material 6a and second conductive bonding materials 6b on the outer surface of the holding member 2. By this arrangement, short circuit between the first and second bonding materials 6a, 6b can be prevented effectively.

Furthermore, a sealing resin 5 is filled so as to cover exposed regions of the oscillation detecting element 2 that are exposed on the side of the opening and the outer surface of the holding member 2. This provides protection of the oscillation detecting element 3 and holding member 2 as well as reinforcement of the fixation of the holding member 2 to the case 1.

It is preferred to form the sealing resin 5 and the supporting resins 4a, 4b with the same epoxy resin. This enhances the adherence between the sealing resin 5 and the supporting resins 4a, 4b, so that the oscillation detecting element 3 can be held more stably.

It should be understood that the present invention is not limited to the foregoing embodiments, but various modifications and improvements may be made without departing from the spirit of the invention.

For example, while the case 1 and holding member 2 are made as separate parts and the holding member 2 is fitted to the case 1 in the foregoing embodiment, the holding member 2 and the case 1 may be molded integrally.

In addition, while the oscillation detecting element 3 is constituted of two piezoelectric substrates bonded together in the foregoing embodiment, three or more substrates may be laminated together. In that case, a greater electric charge can be generated, so that the sensitivity of the acceleration sensor can be improved.

Moreover, while the fixed end of the oscillation detecting element 3 is exposed from the holding member 2 in the foregoing embodiment, the fixed end may be disposed within the through hole 2h.

The invention claimed is:

1. An acceleration sensor comprising an oscillation detecting element that includes a rectangular strip-shaped piezoelectric substrate and signal electrodes attached to both surfaces of the piezoelectric substrate, and a holding member for holding the oscillation detecting element, wherein
    the holding member is provided with a through hole into which the oscillation detecting element is inserted,
    one end portion of the oscillation detecting element is provided with a supporting resin, and
    the oscillation detecting element is held by the holding member with the oscillation detecting element being inserted in the through hole and the supporting resin being in close contact with an inner periphery of the through hole.

2. The acceleration sensor according to claim 1, wherein the oscillation detecting element and the holding member are accommodated in a case in the form of a rectangular parallelepiped, and the holding member is disposed in the vicinity of an opening of the case.

3. The acceleration sensor according to claim 2, wherein the holding member is disposed being spaced apart from the opening of the case toward the interior of the case by a predetermined distance, and a sealing resin is filled in a region enclosed by an outer surface of the holding member and an inner periphery of the case on the opening side.

4. The acceleration sensor according to claim 3, wherein the sealing resin and supporting resin both include an epoxy resin and both the resins are bonded to each other in the vicinity of the opening of the case.

5. The acceleration sensor according to claim 2, wherein terminal electrodes provided on an outer surface of the case are drawn to extend to an outer surface of the holding member and the signal electrodes attached to the piezoelectric substrate are exposed on the side of the opening of the case, and the drawn end portions of the terminal electrodes are electrically connected to the exposed portions of the signal electrodes through a conductive bonding material.

6. The acceleration sensor according to claim 5, wherein a depressed section is provided on the outer surface of the holding member, and the depressed section is filled with the conductive bonding material.

7. The acceleration sensor according to claim 5, wherein the conductive bonding material comprises a first conductive bonding material and a second conductive bonding material and a weir is formed between the first and second conductive bonding materials.

* * * * *